US008484938B2

(12) United States Patent
Cormier et al.

(10) Patent No.: US 8,484,938 B2
(45) Date of Patent: Jul. 16, 2013

(54) DRIVE ROLLER WITH RIBS FOR THE DRAPER CANVAS OF A CROP HEADER

(75) Inventors: Daniel Cormier, Winnipeg (CA);
Francois R. Talbot, Winnipeg (CA);
Keith A. Johnson, Kewaskum, WI (US);
Neal J. Stoffel, Campbellsport, WI (US)

(73) Assignee: MacDon Industries Ltd, Wpg, MB (CA)

( * ) Notice: Subject to any disclaimer, the term of this patent is extended or adjusted under 35 U.S.C. 154(b) by 0 days.

(21) Appl. No.: 13/049,526

(22) Filed: Mar. 16, 2011

(65) Prior Publication Data
US 2012/0233974 A1    Sep. 20, 2012

(51) Int. Cl.
*A01D 43/00*    (2006.01)

(52) U.S. Cl.
USPC .......................................................... 56/181

(58) Field of Classification Search
USPC ................... 56/181, 14.5, DIG. 17; 414/528, 414/527; 198/833, 840, 849, 813, 810.04; 427/597, 554, 556; 219/118, 93, 94
See application file for complete search history.

(56) References Cited

U.S. PATENT DOCUMENTS

| | | | | | |
|---|---|---|---|---|---|
| 2,285,375 | A | * | 6/1942 | Hansen | 68/212 |
| 3,068,710 | A | * | 12/1962 | Beckadolph et al. | 474/205 |
| 3,150,416 | A | * | 9/1964 | Such | 264/119 |
| 3,252,691 | A | * | 5/1966 | Getzin et al. | 261/80 |
| 3,445,785 | A | * | 5/1969 | Koester et al. | 372/40 |
| 3,464,875 | A | * | 9/1969 | Brooks et al. | 156/138 |
| 3,812,562 | A | * | 5/1974 | Lovett | 29/895.21 |
| 3,989,580 | A | * | 11/1976 | Hoback et al. | 156/443 |
| 4,225,036 | A | * | 9/1980 | Michael | 198/840 |
| 4,426,926 | A | * | 1/1984 | Soteropulos et al. | 100/88 |
| 4,475,453 | A | * | 10/1984 | Davis | 100/118 |
| 4,510,741 | A | * | 4/1985 | Campbell et al. | 56/341 |
| 4,723,518 | A | * | 2/1988 | Kawasaki et al. | 123/188.8 |
| 4,910,949 | A | * | 3/1990 | Meyer | 56/341 |
| 5,181,461 | A | * | 1/1993 | Viaud | 100/88 |
| 5,455,992 | A | * | 10/1995 | Kurschatke et al. | 26/99 |
| 5,459,986 | A | * | 10/1995 | Talbot et al. | 56/181 |
| 5,497,872 | A | * | 3/1996 | Pennino | 198/498 |
| 5,657,853 | A | * | 8/1997 | Pennino | 198/499 |
| 5,667,642 | A | * | 9/1997 | Luthi | 162/358.1 |
| 5,768,986 | A | * | 6/1998 | Arnold et al. | 100/88 |
| 5,783,794 | A | * | 7/1998 | Oikawa et al. | 219/118 |
| 5,912,057 | A | * | 6/1999 | Nishimura et al. | 427/597 |
| 5,934,862 | A | * | 8/1999 | Brown et al. | 414/528 |

(Continued)

FOREIGN PATENT DOCUMENTS

DE    10 2007 003195    7/2008
EP    1 776 859 A1    4/2007

(Continued)

*Primary Examiner* — Árpád Fábián-Kovács
(74) *Attorney, Agent, or Firm* — Adrian D. Battison; Ade & Company Inc.

(57) ABSTRACT

A crop harvesting header with a cutter bar and a draper assembly has a draper canvas driven by a drive roller with a cylindrical roller body having an outer surface surrounding an axis of rotation of the roller for engaging an inner drive surface of a canvas wrapped therearound. The roller has a plurality of ribs arranged on the outer surface of the roller body extending along a part of the body in an axial direction and angularly spaced around the outer surface. The ribs have a height less than 6 mm and a width less than 6 mm arranged such that the ribs do not engage into any recesses in the drive surface of the canvas.

12 Claims, 5 Drawing Sheets

U.S. PATENT DOCUMENTS

| | | | | |
|---|---|---|---|---|
| 5,941,168 | A * | 8/1999 | Kluver et al. | 100/87 |
| 6,037,287 | A * | 3/2000 | Fukubayashi | 501/87 |
| 6,152,282 | A * | 11/2000 | Ewan et al. | 198/382 |
| 6,170,549 | B1 * | 1/2001 | Marschke | 156/472 |
| 6,186,732 | B1 * | 2/2001 | Brown et al. | 414/528 |
| 6,302,275 | B1 * | 10/2001 | Shuttleworth et al. | 209/219 |
| 6,318,055 | B1 | 11/2001 | Bird | |
| 6,351,931 | B1 * | 3/2002 | Shearer | 56/181 |
| 6,513,414 | B1 * | 2/2003 | Denney et al. | 83/874 |
| 6,655,121 | B1 * | 12/2003 | Viesselmann et al. | 56/341 |
| 6,668,698 | B1 * | 12/2003 | Denney | 83/874 |
| 6,733,432 | B2 * | 5/2004 | Marschke | 493/463 |
| 7,322,175 | B2 * | 1/2008 | Ferre et al. | 56/16.4 B |
| 7,472,533 | B2 * | 1/2009 | Talbot et al. | 56/181 |
| 7,507,305 | B2 * | 3/2009 | Kawasaki et al. | 148/435 |
| 7,900,414 | B2 * | 3/2011 | Seccombe | 52/478 |
| 7,926,248 | B2 * | 4/2011 | Schmidt et al. | 56/181 |
| 7,934,594 | B2 * | 5/2011 | Richardson et al. | 198/813 |
| 2004/0200203 | A1 | 10/2004 | Dow | |
| 2008/0092508 | A1 * | 4/2008 | Talbot et al. | 56/181 |
| 2008/0184691 | A1 * | 8/2008 | Horchler et al. | 56/341 |
| 2009/0269183 | A1 * | 10/2009 | Richardson et al. | 414/809 |
| 2011/0067374 | A1 * | 3/2011 | James et al. | 56/341 |

FOREIGN PATENT DOCUMENTS

| | | |
|---|---|---|
| FR | 353 805 A | 9/1905 |
| GB | 713 936 A | 8/1954 |
| GB | 1 413 578 A | 11/1975 |
| SU | 1404421 A * | 6/1988 |

* cited by examiner

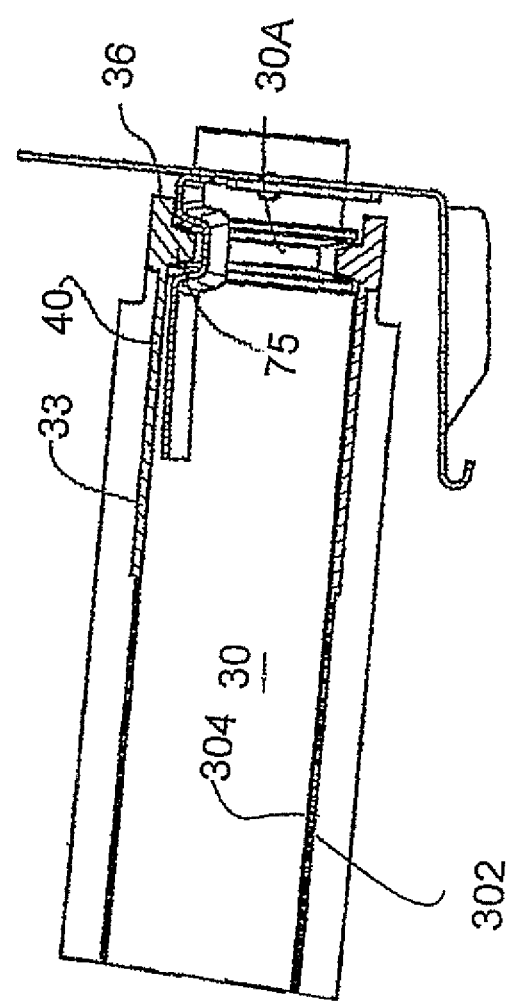

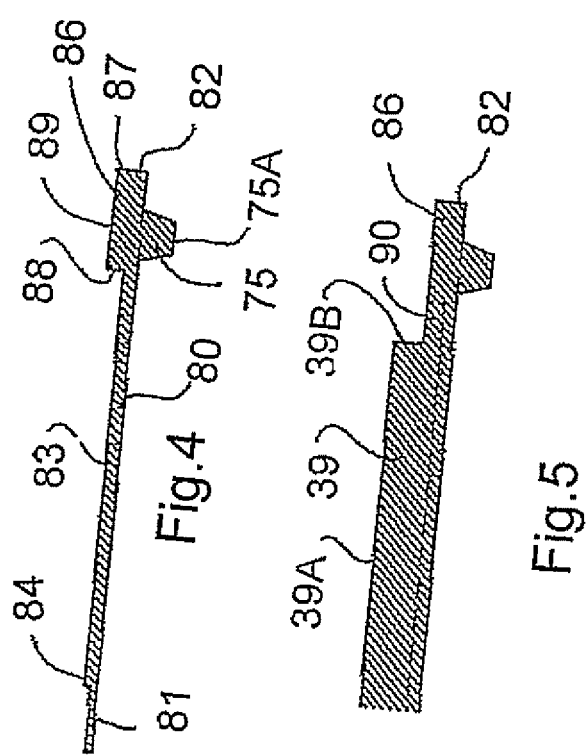

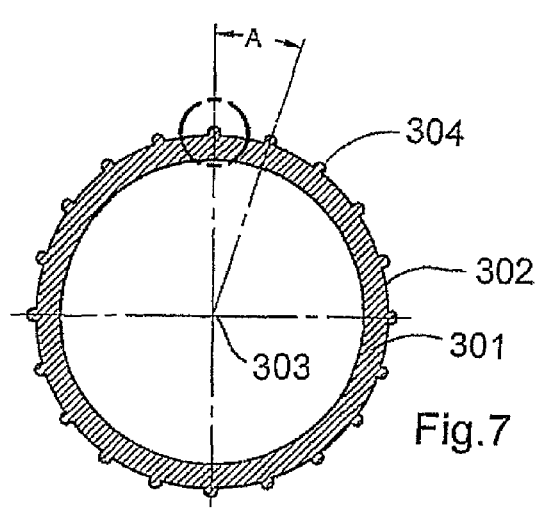
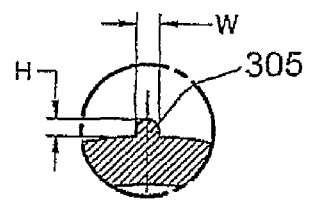
Fig.8
Fig.7
Fig.6
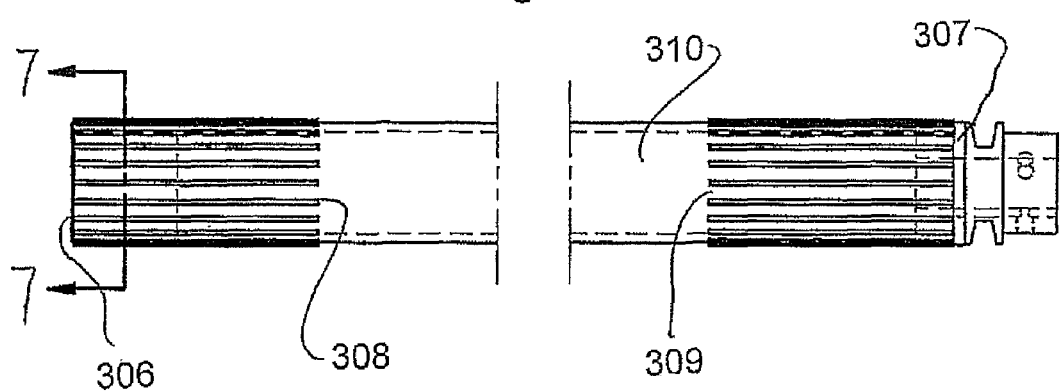

DRIVE ROLLER WITH RIBS FOR THE DRAPER CANVAS OF A CROP HEADER

This invention relates to a drive roller for the draper canvas of a crop header.

BACKGROUND OF THE INVENTION

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper canvas forming a continuous loop of flexible material wrapped around the rollers so as to define a front edge of the canvas adjacent the cutter bar, a rear edge of the canvas spaced rearwardly of the cutter bar, an upper run of the canvas on top of the roller and a lower run of the canvas below the rollers. The cut crop thus falls rearwardly onto the upper run of the canvas and is transported longitudinally of the header. Generally, between the draper rollers there is provided a support plate assembly for the upper run of the draper canvas to prevent sagging.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper canvas normally comprises a fabric which is coated with a rubber material which is then vulcanized after forming of the fabric into the required shape and after attachment thereto of transverse slats.

The arrangement shown in U.S. Pat. No. 5,459,986 (Talbot) issued Oct. 24, 1995 and assigned to the present Assignees has achieved significant success and has been used for many years. It provides a seal between an under surface of a rearwardly extending element of the cutter bar and a front edge portion of the upper surface of the canvas.

Not shown in the above patent is the conventional guiding arrangement to prevent misalignment of the draper canvas on the rollers and this is provided by a bead located on the underside of the canvas which runs in a groove in the roller.

An alternative arrangement is shown in U.S. Pat. No. 7,472,533 (Talbot et al) issued Jan. 6, 2009 also of the present Assignees and originally published Apr. 24, 2008. This provides a crop harvesting header with a cutter bar and a draper canvas with a plurality of transverse slats and a resilient strip across a front edge of the outer surface in front of the front end of the slats to cooperate with a rearwardly projecting element of the cutter bar extending over the upper run of the draper canvas to engage the upper surface of said strip to form a seal to inhibit entry between the cutter bar and the draper canvas of materials carried by the cut crop. There is also provided a bead on the canvas on the surface opposite the strip within the width of the strip. The arrangement can be symmetrical with a strip at each of the front and rear edges spanned by the slats extending between them, with beads on each edge opposite the front and rear strips respectively.

The disclosures of the above patents are incorporated herein by reference.

SUMMARY OF THE INVENTION

It is one object of the invention to provide an improved design of header and particularly the drive roller to the draper canvas.

According to the invention there is provided a drive roller for a draper canvas comprising:

a cylindrical roller body having an outer surface surrounding an axis of rotation of the roller for engaging a drive surface of a canvas wrapped therearound;

and a plurality of raised elements arranged on the outer surface of the roller body;

the raised elements having a height and width arranged such that the raised elements do not engage into any recesses in the drive surface of the canvas.

Preferably the raised elements are elongate in the form of ribs, ridges or teeth applied onto the surface of the roller. The term "ribs" is used hereinafter to identify these elements but is not intended to imply any particular shape or orientation of the elements.

Preferably the ribs extend along the roller, that is they are not wholly in a radial plane of the roller so that each rib extends has a component extending along the draper canvas for frictional engagement therewith. Typically the ribs are parallel to the axis but they may be helical or may have more complex shapes including steps or wave shapes. Also a diamond or cross pattern may be used.

The ribs which extend along the roller are preferably angularly spaced around the roller.

Preferably the ribs are arranged only at ends of the rollers such that each end of the roller includes a respective section of the ribs which extends from the end of the roller to a position spaced from the section of ribs at the other end.

Preferably the ribs have a height less than 6 mm and more preferably in the range 1 to 3 mm. Preferably the ribs have a width less than 6 mm and more preferably in the range 1 to 3 mm.

Preferably the ribs have an angular spacing around the roller greater than 10 degrees and more preferably in the range 10 to 45 degrees.

Preferably the outer surface is formed of steel and the ribs are formed of a material clad onto the steel such as by laser cladding using a cladding material which creates a carbide content greater than 30% and more preferably greater than 50%. The upper limit, in practice, for carbide concentration is about 70%. Once this threshold is exceeded, the amount of binder is not sufficient to create the necessary matrix to bind the elements together.

Also, other hard materials can be used as a replacement for the tungsten carbide to create the raised elements or ribs.

Other technologies that could be used to achieve the raised elements include welding (fig or mig), thermal spray, brazing, machining, broaching, or swaging.

The invention also includes the combination of the roller with a canvas to form a draper assembly having a continuous belt of a fabric material with an inner surface for engaging a plurality of rollers and an outer surface for engaging a material to be carried thereon; and a drive roller as defined above where the ribs having a height and width arranged such that the ribs do not engage into corresponding recesses in the inner surface of the belt, which surface is free from recesses shaped and arranged to receive the ribs.

The invention also includes a header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that cut crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

the draper assembly including a draper canvas forming a continuous loop of flexible material wrapped around the rollers so as to define an upper run of the draper canvas on top of the rollers and a lower run of the draper canvas below the rollers and so as to define an outer surface of the draper canvas which faces outwardly of the loop that the outer surface forms the upper surface of the upper run and the lower surface of the lower run and an opposed inner surface of the draper canvas which faces inwardly of the loop;

the draper canvas comprising a continuous belt of a fabric material having an inner surface for engaging a plurality of guide rollers and an outer surface for engaging a material to be carried thereon;

where the draper canvas is as defined above.

BRIEF DESCRIPTION OF THE DRAWINGS

One embodiment of the invention will now be described in conjunction with the accompanying drawings in which FIGS. 1 to 5 are taken from prior art patent U.S. Pat. No. 7,472,533 cited above and are included for completeness only:

FIG. 1 is a top plan view of the front part of a header of the prior art.

FIG. 2 is a cross sectional view along the lines 2-2 of FIG. 1 showing the front part of the header and draper canvas.

FIG. 3 is a cross sectional view along the lines 2-2 of FIG. 1 showing the rear part of the header and draper canvas and the co-operation of the rear guide bead with a groove in the roller.

FIG. 4 is a cross sectional view through one edge of the canvas only taken at location where there is no transverse slat.

FIG. 5 is a cross sectional view through one edge of the canvas only taken at a transverse slat.

FIG. 6 is a side elevational view of a roller according to the present invention to be used in the header described above.

FIG. 7 is a cross-sectional view through the roller of FIG. 6.

FIG. 8 is a cross-sectional view through the roller of FIG. 6 on an enlarged scale showing the shape of one of the ribs.

In the drawings like characters of reference indicate corresponding parts in the different figures.

DETAILED DESCRIPTION

The following description is taken from the above prior art patent. Only those parts of the header which are of importance to the present invention are shown in the above figures of the present application and the remaining parts of the header including the frame structure, drives, ground wheels and the like are omitted as these will be well known to one skilled in the art.

The header therefore comprises a frame, one element of which is indicated at 10 in the form of a beam extending horizontally and forwardly from a rear support frame structure (not shown) to a cutter bar assembly generally indicated at 11 for support of that cutter bar assembly. The beam 10 forms one of a plurality of such beams arranged at spaced positions along the length of the header frame so as to support the cutter bar assembly 11 as an elongate structure across the front edge of the header.

Figure 1:
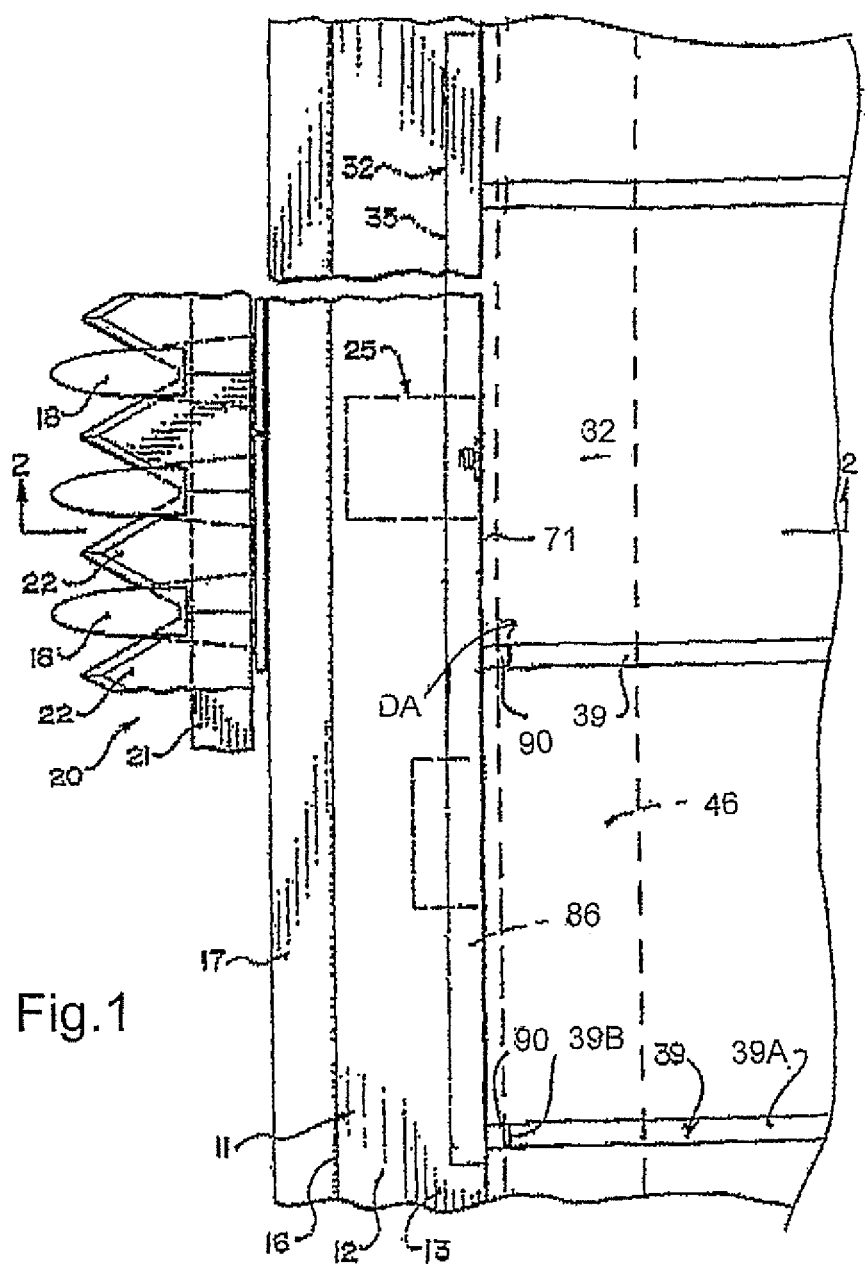

The cutter bar comprises a generally C-shaped beam 12 which provides structural support for the cutter bar with the C-shaped beam being welded to the front ends of the forwardly extending beams 10. The C-shape beam 12 includes a top plate portion 13, a bottom plate portion 14 and a forward plate portion 15 which converges from the top and bottom plate portions toward a front apex 16 forming a forward most point of the beam 12. At the apex 16 is welded a longitudinally extending bar 17 which forms a support for a plurality of knife guards 18 only some of which are shown in FIG. 1 for convenience of illustration. The knife guards are of course of well known construction and their shape is shown only schematically. The knife guards carry a sickle knife assembly 20 having a longitudinally reciprocating bar 21 driving a plurality of triangular knife blades 22 which sit on the knife guards and reciprocate back and forth across the knife guards in a cutting action. Again this construction is well known and therefore detail is not necessary.

The cutter bar support beam 12 also carries an elongate angle iron 23 which is welded onto the top plate portion 13 on the underside thereof at the front edge thereof with the angle iron extending vertically downwardly and then forming a support plate 24 extending forwardly therefrom toward the apex 16.

The draper assembly generally indicated at DA includes a first draper support roller 30 and a second draper support roller (not shown). One of these rollers is driven by a drive motor (not shown) to effect rotation of the draper in conventional manner. The draper assembly further includes a draper canvas 32 in the form of a continuous loop or band of fabric which is wrapped around the rollers at respective ends to form an upper run 33 of the draper canvas on top of the rollers and a lower run 34 of the canvas underneath the rollers. The rollers are thus spaced longitudinally of the cutter bar and arranged with their axes of rotation parallel and at right angles to the cutter bar. The draper canvas 32 has an inner drive surface 304 engaging an outer surface of the roller 30. The draper canvas thus includes a front edge 35 of the upper run which is adjacent the cutter bar and a rear edge 36 of the upper run 33 which is remote from the cutter bar and spaced rearwardly therefrom thus defining therebetween a flat surface of the upper run for transportation of the crop longitudinally of the header. The lower run 34 also includes a front edge 37 and a rear edge. The draper canvas includes a plurality of conventional transverse slats 39 which assist in carrying the crop along the draper canvas. Each edge of the draper canvas can include a conventional folded seam so as to define a portion of the canvas material which is folded back as indicated at 40 with that folded back portion being folded back on top of the fabric layer and bonded to the canvas by the vulcanization effect in the manufacture of the canvas.

The upper run of the draper canvas is supported by a support plate assembly 45 which includes a front plate and includes a center plate and rear plates which are not shown for convenience of illustration. The front plate includes a horizontal top plate portion 46, shown in phantom in FIG. 1, laying underneath the upper run of the draper canvas adjacent the front edge for supporting that front edge in sliding movement across the top surface of that plate. The support plate 46 further includes a vertical plate portion, which extends downwardly from a front edge of the top plate portion (not shown in the figures). At a bottom edge of the vertical plate portion is provided a lower horizontal plate portion thus forming the front support plate into a generally C-shape to provide structural strength so that the support plate is essentially self supporting mounted on mounting brackets (also not shown).

The rollers 30 are carried on the support plate 46. Further details of the brackets and support elements are described in the above patent of Talbot.

The length of the bracket 25 is arranged so that the front edge 49 of the support plate is spaced rearwardly from the front edge 35 of the upper run of the draper canvas. In addition the front end of the rollers 30 is spaced rearwardly from the front edge 35 of the upper run of the canvas. This recessing of the front edges of the support plate member and of the rollers provides a portion 70 of the front edge of the draper canvas which is cantilevered outwardly beyond the support provided by those elements.

The beam 12 of the cutter bar is shaped so that the top plate portion 13 extends rearwardly to a rear edge 71 which overlaps the portion 70. The rear edge 71 is located therefore at a position rearwardly of the front edge 35 of the draper canvas and in a position forwardly of the front edge 49 of the support plate and the front ends 65 of the draper rollers. That portion of the draper canvas therefore which engages the underside 72 of the top plate portion 13 is unsupported on its underside and is therefore free to flex downwardly should it be depressed downwardly by the presence of material collecting on the under surface 72. The top plate portion 13 of the beam 12 is substantially horizontal that is parallel to the generally horizontal surface of the upper run. The co-operation therefore between the surface 72 of the upper plate portion 13 and the upper surface of the draper canvas at the portion 70 provides a seal which inhibits the tendency of materials to pass between the draper canvas and the cutter bar. This seal therefore inhibits the build-up of materials inside the C-shape of the cutter bar and between the draper canvas upper run and lower run and around the draper rollers which can of course cause damage.

At the rear edge 36, the draper canvas is guided on the draper roller by a V groove 30A in the roller 30 into which projects from the back of the canvas a V-shaped guide rib 75 which runs along the inner surface of the canvas along its full length.

The construction of the draper of the present invention is shown in FIGS. 4 and 5. Thus the draper of the present invention is symmetrical in that the draper can be reversed by rotating the draper so that the front edge is turned to become the rear edge and vice versa. Thus only the front edge is shown in FIGS. 1, 4 and 5 with it being understood that the rear edge is exactly symmetrical. Thus in FIG. 4 is shown a portion of the draper canvas which includes a base layer or sheet 80 which is formed of a fabric sheet 81 which is folded at its edge 82 to form a portion 83 which is folded back on top of the layer 81 to form an end edge 84 of the folded back portion 83 which lies on top of the fabric of the layer 81 spaced away from the edge 82. The canvas carries a coating or infused rubberized layer in a conventional manner. At the edge 82 is provided a strip 86 of a resilient material. The resilient material is preferably of the same construction as the rubberized coating so that it can be vulcanized with the structure of the canvas and molded in place as part of the manufacturing process. The strip 86 has a front edge 87 which is at or immediately adjacent the edge 82 of the base layer of the canvas. In the embodiment shown the front edge 87 of the strip is immediately coincident with the edge 82. The strip includes a rear edge 88 spaced away from the edge 87 into the body of the canvas. The strip has an upper surface 89 which is flat and smooth. Thus the strip is rectangular with the side edges 87 and 88 being vertical and the top surface 89 horizontal. However the strip may be shaped with inclined or tapered side edges 87 and 88.

In the example shown the strip has the width of the order of 1" (25 mm) and a height of the order of 1/8" (4.0 mm). The strip thus stands up from the upper surface of the base layer of the draper canvas that is the upper surface of the folded back portion 83.

On the underside of the draper canvas is molded the bead 75 which is generally V-shaped so that the sides are tapered downwardly and inwardly to a bottom surface 75A which is narrower than the base of the bead. The bead is located at a position spaced from the edge 82 but underlying the strip 86 so that the edge of the bead is spaced from the edge 82 by a distance less than the edge 88 of the strip.

As shown in FIG. 5 the canvas also carries slats 39 which stand upwardly from the upper surface of the canvas to a top edge 39A which is at a height significantly greater than the height of the strip 86. Each slat extends transversely across the draper canvas to a position closely adjacent the strip at the respective side edges of the canvas. Thus each slat extends to an end edge 39B which is spaced from the side edge 82 by a distance greater than the spacing of the edge 88 of the strip so that the edge 39B of the slat is spaced from the edge 88 of the strip. The slats 39 are molded integrally with the strip 86 by providing portions 90 which extend from the edge 39B of the slat to the edge 88 of the strip 86. These portions as best shown in FIG. 1 have a width equal to the width of the slat 39 to which they are attached and a height (as shown in FIG. 5) equal to the height of the strip 86. These portions thus act to integrate the structure so that the slats connect into the strip to reduce the tendency of the slats to tear away from the canvas since the same resilient material forming the strip extends into the slat and thus is resistant to stripping or tearing from the base layer of the draper canvas. In the example shown, the bead 75 has a width at its base of the order of 1/2" (13 mm) and a height from the under-surface of the canvas of the order 1/3" (8 mm). The center of the bead is spaced from the edge 82 by a distance of the order of 2/3" (16 mm). This suitably locates the bead at a position on the canvas for cooperation with the groove in the roller at the rear of the canvas as best shown in FIG. 3.

Figure 2:
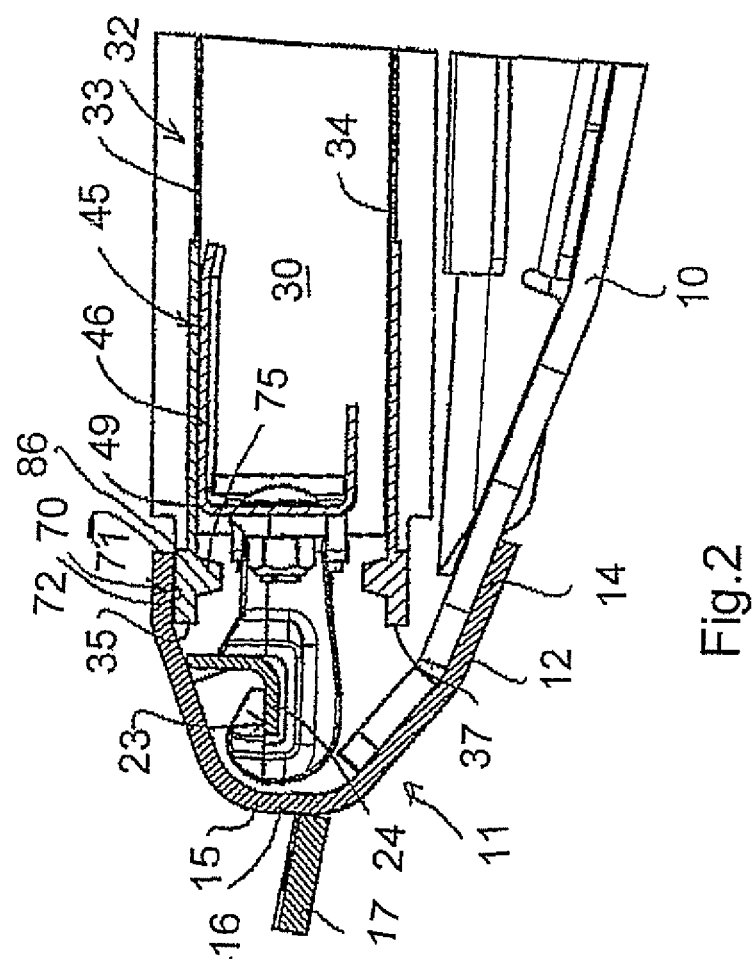

Turning now to FIG. 2, it will be noted that the side edge 88 of the strip is substantially coincident with the end edge 71 of the plate 13 so that the whole of the strip 86 underlies the plate 13. The presence of the strip 86 provides an improved sealing effect between the surface 89 of the strip and the surface 72 of the plate 13 due to an increase in pressure therebetween. In addition the presence of the shoulder or edge 88 provides a raised surface standing upwardly from surface of the canvas to inhibit the penetration of material into the space between the surfaces 89 and 72. The surface 89 is formed as a flat surface molded onto the top of the resilient strip so that the surface 89 can be formed if required. Also it is or can be smoother than the surface of the canvas itself to provide an improved contact surface engaging the surface 72.

It will be noted in FIG. 2 that the bead 75 at the front edge is located at a position spaced forwardly of the edge 49 of the support plate and forwardly of the end of the roller. Thus the bead 75 at the front edge of the canvas has no effect since it is engaging no component of the roller or support plate. However it will be noted that the bead 75 at the rear edge is located in engagement with a groove in the roller. In this way wear of the structure takes place at the strip 86 at the front edge and the bead 75 at the rear edge. These two components are worn in use so that the strip 86 at the rear edge and the bead 75 at the front edge remain unworn. Rotation of the canvas when the wear has become excessive allows therefore the canvas to continue in use while the strip 86 from the rear edge is moved for the sealing effect at the front edge and the bead 75 is moved to the rear edge for providing guiding action.

Turning now to the present invention, as shown in FIGS. 6, 7 and 8 one or both of the rollers 30 and particularly the roller which provides the drive input is shown and comprises a cylindrical roller body 301 having an outer generally cylindrical drive surface 302 surrounding an axis 303 of rotation of the roller for engaging an inner drive surface 304 (shown in FIG. 3) of the canvas 32 wrapped around the roller.

The drive surface 302 is modified by the addition of a plurality of ribs 305 arranged on the outer surface of the roller body with the ribs 305 extending along at least a part of the body preferably generally in an axial direction. The ribs 305 extend from an end 306, 307 at the end of the effective drive surface of the roller to an intermediate position 308, 309. While the ribs can extend along the full length of the roller typically the ends 308 and 309 are spaced outwardly from one another leaving a center section 310 of the roller which is bare of the ribs. The ribs are angularly spaced around the outer surface at an angle of spacing A. The ribs have a height H and a width W. H is less than 6 mm and typically lies in the range 1 to 3 mm. W is less than 6 mm and typically lies in the range 1 to 3 mm. A is less than 45 degrees and typically lies in the range 10 to 45 degrees.

The outer surface is formed of a steel sheet wrapped round the axis and the ribs are formed of a material clad onto the steel. This can preferably be done by laser cladding. Other technologies that could be used to achieve the raised elements or ribs include welding (tig or mig), thermal spray, brazing, machining, broaching, or swaging.

Laser cladding is a process in which a laser heat source is used to deposit a desired metal on to a surface. The deposited material can be transferred to the substrate by one of several methods including powder injection, pre-placed powder on the substrate or by wire feeding. The powder can be a matrix of tungsten carbide and binding materials which preferably contains 60% or more of tungsten carbide. However a suitable product can be obtained with a lower level of the order of 30-40% tungsten powder for example. Other powders than tungsten carbide such as tool steel and high speed steel powders that are also available may also show improved wear but to date none have been found to be as effective as the tungsten carbide. Some of the other laser cladding processes can be used which use wire instead of powder. Also further systems are provided which use a hybrid of cold spray with a laser assist.

This provides attached ribs which remain in place despite the significant frictional forces involved in driving the belt on the roller and also lead to reduced wear of the roller at the ends where the primary forces are applied between the belt and roller. For this purpose, the ribs are formed of a material having a carbide content greater than 30% and preferably greater than 50%. A carbide content greater than 50% is desirable to reduce wear and this can preferably be more than 60 or 70%. It will be appreciated that the ribs must last many hours in order to maintain the frictional drive to the belt at the required level for the life of the system.

The draper canvas typically has two plies of the fabric at the side edges so that the draper canvas is thicker at this area. Thus the provision of the ribs only in this area can provide the required drive which is more aggressive at edges. It is of course necessary not only to provide the required wear characteristics but also to provide an acceptable level of drive friction, bearing in mind that a positive drive using inter-engaging members is not acceptable. Previously rubber rollers have been proposed and widely used since metal rollers have been found to be too slippery when wet. In the present arrangement, the high wear characteristics of the added ribs ensures that the material does not wear away sufficiently quickly that the roller reverts to an unacceptable smooth metal roller which is known to provide insufficient traction.

The shape of the ribs is such that the upper surface is domed or semi-cylindrical as best shown in FIG. 8. This shape of the profile of the ribs depends on several factors including the powder used and the parameters in the process and is difficult to control. However typically the ribs have no sharp edges at the sides and rely on the additional frictional engagement with the belt surface rather then any interlocking engagement therewith. However ribs with sharp edges such as of a rectangular or square cross-section square may be acceptable.

The inner surface of the belt is free from recesses shaped and arranged to receive the ribs. That is the arrangement is not one where the ribs are intended to engage into slots in the belt surface to provide a positive drive between the belt and the roller but instead the ribs have a height and width arranged to be small such that the ribs do not engage into corresponding recesses in the belt. Thus the belt is basically smooth and any roughness or projections are designed not to engage the ribs in a positive coupling action.

Thus the header of the present invention for cutting and transporting a standing crop comprises the header frame, partly shown at 10, the elongate cutter bar 17 arranged along a front edge of the frame and the knife 20 mounted on the cutter bar for cutting the standing crop.

The draper assembly DA is mounted on the header frame rearwardly of the cutter bar such that cut crop falls onto the draper assembly for transportation longitudinally of the header. The draper assembly DA includes the first and a second draper guide rollers 30 each arranged at a respective end of the draper assembly spaced apart along the cutter bar with an axis of each guide roller arranged substantially at right angles to the cutter bar.

The draper assembly DA further includes a draper canvas 32 forming a continuous loop of flexible material wrapped around the rollers 30 so as to define an upper run 33 of the draper canvas on top of the rollers and a lower run 34 of the draper canvas below the rollers and so as to define an outer surface of the draper canvas which faces outwardly of the loop.

Other variations which can be used can include where the ribs are full length, where the ribs are arranged in multiple segments along the roller and where the ribs are in spiral form.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A header for cutting and transporting a standing crop comprising:
   a header frame;

an elongate cutter bar arranged along a front edge of the frame;

a knife mounted on the cutter bar for cutting the standing crop;

a draper assembly mounted on the header frame rearwardly of the cutter bar such that cut crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

the draper assembly including a draper canvas forming a continuous loop of flexible material wrapped around the rollers so as to define an upper run of the draper canvas on top of the rollers and a lower run of the draper canvas below the rollers and so as to define an outer surface of the draper canvas which faces outwardly of the loop that the outer surface forms the upper surface of the upper run and the lower surface of the lower run and an opposed inner surface of the draper canvas which faces inwardly of the loop;

the draper canvas comprising a continuous belt of a fabric material having an inner surface for engaging the first and second draper guide rollers and an outer surface for engaging a material to be carried thereon;

said first draper guide roller comprising:

a cylindrical metal roller body having an outer metal cylindrical surface surrounding an axis of rotation of the roller for engaging a drive surface of the canvas wrapped therearound;

and a plurality of raised elements on the outer metal surface of the roller body so as to be raised to a height from the metal surface;

the raised elements being arranged in a pattern on the metal surface so as to leave areas of the metal surface between the raised elements which are free from the raised elements so that the metal surface is bare;

wherein the height of the raised elements from the metal surface is less than 6 mm;

wherein the raised elements comprise a material which is, relative to the outer metal cylindrical surface, a hard wear resistant material;

and wherein the material comprising the raised elements is clad as an additional material onto the outer metal cylindrical surface of the roller.

2. The header according to claim 1 wherein the raised elements are arranged only at ends of the outer metal cylindrical surface of the roller such that each end of the roller includes a respective section of the raised elements which extends from the end of the roller to a position spaced from the section of raised elements at the other end of the roller leaving a center portion extending longitudinally along the cylindrical surface so that the center portion is bare of the raised elements.

3. The header according to claim 1 wherein the outer metal surface of the roller is formed of steel and the hard wear resistant material of the raised elements is carbide.

4. The header according to claim 1 wherein the content of the hard wear-resistant material in the raised elements is greater than 30 per cent.

5. The header according to claim 1 wherein the raised elements comprise ribs where each rib is spaced from the next by an area of the metal surface which is bare.

6. The header according to claim 1 wherein the ribs extend generally longitudinally of the roller and are angularly spaced around the roller.

7. The header according to claim 1 wherein the height of the raised elements is in the range 1 to 3 mm.

8. The header according to claim 1 wherein the draper canvas has at each respective edge thereof a strip which contains two overlying plies of the fabric material so that the draper canvas at the strips is thicker than at a center portion of the draper canvas, wherein the raised elements are arranged in first and second portions arranged at respective ends of the rollers and wherein the first and second portions are arranged on the roller substantially only at the strips of the draper canvas.

9. A header for cutting and transporting a standing crop comprising:

a header frame;

an elongate cutter bar arranged along a front edge of the frame;

a knife mounted on the cutter bar for cutting the standing crop;

a draper assembly mounted on the header frame rearwardly of the cutter bar such that cut crop falls onto the draper assembly for transportation longitudinally of the header;

the draper assembly including a first and a second draper guide roller each arranged at a respective end of the draper assembly spaced apart along the cutter bar with an axis of each guide roller arranged substantially at right angles to the cutter bar;

the draper assembly including a draper canvas forming a continuous loop of flexible material wrapped around the rollers so as to define an upper run of the draper canvas on top of the rollers and a lower run of the draper canvas below the rollers and so as to define an outer surface of the draper canvas which faces outwardly of the loop that the outer surface forms the upper surface of the upper run and the lower surface of the lower run and an opposed inner surface of the draper canvas which faces inwardly of the loop;

the draper canvas comprising a continuous belt of a fabric material having an inner surface for engaging the first and second draper guide rollers and an outer surface for engaging a material to be carried thereon;

the draper canvas having at each respective edge thereof a strip which contains two overlying plies of the fabric material so that the draper canvas at the strips is thicker than at a center portion of the draper canvas;

said first draper guide roller comprising a drive roller for a draper canvas comprising:

a cylindrical metal roller body having an outer metal cylindrical surface surrounding an axis of rotation of the roller for engaging a drive surface of the canvas wrapped therearound;

and a plurality of raised elements on the outer metal surface of the roller body so as to be raised to a height from the metal surface;

the raised elements being arranged in first and second portions arranged at respective ends of the rollers with each of the first and second portions containing a pattern on the metal surface so as to leave areas of the metal surface between the raised elements which are free from the raised elements so that the metal surface is bare;

wherein the first and second portions are arranged on the roller substantially only at the strips of the draper canvas.

10. The header according to claim 9 wherein the raised elements comprise ribs where each rib is spaced from the next by an area of the metal surface which is bare.

11. The header according to claim 10 wherein the ribs extend generally longitudinally of the roller and are angularly spaced around the roller.

12. The header according to claim 9 wherein the height of the raised elements is in the range 1 to 3 mm.

* * * * *

UNITED STATES PATENT AND TRADEMARK OFFICE
CERTIFICATE OF CORRECTION

Page 1 of 1

PATENT NO. : 8,484,938 B2
APPLICATION NO. : 13/049526
DATED : July 16, 2013
INVENTOR(S) : Daniel Cormier et al.

It is certified that error appears in the above-identified patent and that said Letters Patent is hereby corrected as shown below:

Title Page:

Item (73) the Assignee should be MacDon Industries Ltd., 680 Moray Street, Winnipeg, MB, R3J 3S3, Canada
AND
Kondex Corporation, 1500 Technology Drive, Lomira, WI, 53048, United States of America Signed and Sealed this
Thirteenth Day of May, 2014

Michelle K. Lee
*Deputy Director of the United States Patent and Trademark Office*